United States Patent
Karappa et al.

(10) Patent No.: US 11,423,124 B2
(45) Date of Patent: Aug. 23, 2022

(54) SYSTEMS AND METHODS FOR ASSET MANAGEMENT

(71) Applicant: ServiceNow, Inc., Santa Clara, CA (US)

(72) Inventors: Virendra Karappa, Santa Clara, CA (US); Rajat Jain, Sunnyvale, CA (US)

(73) Assignee: ServiceNow, Inc., Santa Clara, CA (US)

( * ) Notice: Subject to any disclaimer, the term of this patent is extended or adjusted under 35 U.S.C. 154(b) by 395 days.

(21) Appl. No.: 16/722,339

(22) Filed: Dec. 20, 2019

(65) Prior Publication Data

US 2021/0192013 A1 Jun. 24, 2021

(51) Int. Cl.
| | |
|---|---|
| G06F 9/44 | (2018.01) |
| G06F 9/445 | (2018.01) |
| G06F 9/455 | (2018.01) |
| G06F 21/10 | (2013.01) |
| G06F 8/77 | (2018.01) |
| G06F 8/71 | (2018.01) |
| G06F 16/21 | (2019.01) |
| G06F 16/00 | (2019.01) |

(52) U.S. Cl.
CPC .............. *G06F 21/105* (2013.01); *G06F 8/71* (2013.01); *G06F 8/77* (2013.01); *G06F 16/21* (2019.01); *G06F 16/00* (2019.01)

(58) Field of Classification Search
CPC ........ G06F 21/105; G06F 16/21; G06F 16/27; G06F 8/71; G06F 8/77; G06F 16/00; G06F 9/45558; G06F 9/546; H04L 67/10
See application file for complete search history.

(56) References Cited

U.S. PATENT DOCUMENTS

| | | |
|---|---|---|
| 6,321,229 B1 | 11/2001 | Goldman et al. |
| 6,609,122 B1 | 8/2003 | Ensor |
| 6,816,898 B1 | 11/2004 | Scarpelli |
| 7,020,706 B2 | 3/2006 | Cates |
| 7,028,301 B2 | 4/2006 | Ding |

(Continued)

OTHER PUBLICATIONS

U.S. Appl. No. 16/575,052, filed Sep. 18, 2019, Kenkre et al.
U.S. Appl. No. 16/591,245, filed Oct. 2, 2019, Chaudhary et al.

*Primary Examiner* — Thuy Dao
(74) *Attorney, Agent, or Firm* — Fletcher Yoder PC

(57) ABSTRACT

A management system to facilitate improved software asset management includes a management server coupled to a client instance and certain databases. The client instance stores identifiers associated with software programs accessible to users through the client instance. To enable software asset management features, the management server receives the identifiers and determines, based on the certain databases, whether the identifiers are associated with software models of the software programs. Notably, in response to an identifier of a particular software program not being associated with a software model, the management server generates a software model for the particular software program, and further, stores entries or relationships within the certain databases. Thus, the management server may output the software model to the client instance to enable a client to provide attributes to be included in the software model, further improving a quality of the software asset management features accorded by the management system.

20 Claims, 10 Drawing Sheets

(56) References Cited

U.S. PATENT DOCUMENTS

| | | |
|---|---|---|
| 7,062,683 B2 | 6/2006 | Warpenburg |
| 7,131,037 B1 | 10/2006 | LeFaive |
| 7,170,864 B2 | 1/2007 | Matharu |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota et al. |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers et al. |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 10,599,678 B2 * | 3/2020 | Kapoor ............... G06F 16/211 |

* cited by examiner

| SOFTWARE PRODUCT DEFINITIONS | SEARCH | PUBLISHER PART NUMBER ▽ | SEARCH | ▽△ | ▽ | 1 | TO 20 OF 7,699 | △ | △△ |
|---|---|---|---|---|---|---|---|---|---|
| ≡ PUBLISH PART NUMBER(IDENTIFIER) | ≡ PUBLISHER | ≡ PRODUCT | ≡ LICENSE TYPE | ≡ VERSION | ≡ EDITION | ≡ PLATFORM | | | |
| SEARCH | SEARCH | SEARCH | SEARCH | SEARCH | SEARCH | SEARCH | | | |
| 269-04653 | PUBLISHER1 | PRODUCT1 | PERPETUAL | STARTS WITH XP | PROFESSIONAL FRONTP | WINDOWS | | | |
| B68-00629 | PUBLISHER1 | PRODUCT2 | PERPETUAL | STARTS WITH XP | PROFESSIONAL FRONTP | WINDOWS | | | |
| 269-04656 | PUBLISHER1 | PRODUCT3 | PERPETUAL | STARTS WITH XP | PROFESSIONAL FRONTP | WINDOWS | | | |
| 100220640 | PUBLISHER2 | PRODUCT4 | PERPETUAL | STARTS WITH XP | PROFESSIONAL FRONTP | WINDOWS | | | |
| 269-05417 | PUBLISHER3 | PRODUCT5 | STEP-UP | STARTS WITH XP | PROFESSIONAL FRONTP | WINDOWS | | | |
| B68-00632 | PUBLISHER4 | PRODUCT6A | STEP-UP | STARTS WITH XP | PROFESSIONAL FRONTP | WINDOWS | | | |
| B68-00075 | PUBLISHER4 | PUBLISHERB | PERPETUAL | STARTS WITH XP | PROFESSIONAL FRONTP | WINDOWS | | | |

FIG. 10

SYSTEMS AND METHODS FOR ASSET MANAGEMENT

BACKGROUND

The present disclosure relates generally to systems and methods for asset management. In particular, the present disclosure relates to managing unknown software programs.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT), data, and services for their continued operation and success. A respective organization's IT infrastructure may have associated hardware resources (e.g., computing devices, load balancers, firewalls, switches) and/or software resources (e.g., productivity software, database applications, custom applications). Over time, more and more organizations have turned to cloud computing approaches to supplement or enhance their IT infrastructure solutions.

Cloud computing relates to sharing computing resources via the Internet. In particular, a cloud computing infrastructure enables users (e.g., individuals, enterprises) to access a shared pool of computing resources (e.g., servers, storage devices, networks, applications, other computing based services). By doing so, users are able to access computing resources on demand that may be located at remote locations. These resources may be used to perform a variety of computing functions (e.g., storing and/or processing large quantities of computing data). For enterprise and other organization users, cloud computing provides flexibility in accessing resources, while reducing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services include infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software may be licensed on a subscription basis, hosted on a remote machine, and accessed by client customers as needed. For example, users are generally able to access a variety of enterprise and/or IT-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Certain enterprise and other organization users may implement multiple software programs on their end-user or client devices as part of performing their respective core functions. Accordingly, as an additional feature of IaaS, SaaS, and/or PaaS, a service provider that delivers a respective service may provide management features that enable users to efficiently track, analyze, and manage their usage of various software programs, which are generated by various software publishers. For example, based on publisher-derived descriptions of the software programs, a service platform may identify certain software programs installed or accessed by each user to enable management features. However, it may be difficult to provide certain management features of a software program when the software publisher of the software program has not yet released identification information of the software program. As such, there is a need to improve the manner in which software asset management is provided for the latest releases of software programs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach generally relates to systems and methods for asset management (e.g., software asset management). In particular, the disclosed management system may be embodied in a management server associated with a provider instance, which is in communication with multiple user or client instances. Each client instance may be propagated to one or multiple client devices, from which respective users may utilize multiple software programs through the respective client instance. Notably, each client instance may generally be aware of or able to access an identifier or identifier number, such as a stock keeping unit (SKU) or publisher part number (PPN), of each software program of the client instance. To enable asset management of the software programs used across multiple client instances, the management server may maintain one or multiple databases that enable association of the identifiers with respective software models. Each software model generally defines a specific set of attributes (e.g., name, publisher, edition, version) of the underlying software program. Thus, based on the one or more databases, the management server of the management system converts or translates the identifiers into digestible or recognizable software models that are leveraged for software analysis, metering, and/or management.

Indeed, the one or more databases of certain embodiments may include an identifier database that associates identifiers of software programs with map identifiers, and a software model database that associates the map identifiers with software models of the software programs. As discussed below, the software model enables the management server to analyze and manage how the client instance utilizes the software program. Thus, the management server may query the identifier databases using an identifier to receive a corresponding map identifier, and then query the software model database using the map identifier to receive a corresponding software model. In other embodiments, the one or more databases may include an identifier-software model database, where the management server may query the identifier-software model database using an identifier and may directly receive the corresponding software model.

As presently recognized, problems may arise when the management server lacks a software model for a given identifier that is received from a client instance, where the management server may seek to provide management features based on the software model. Such situations may be caused when the client instance is running a variety or version (e.g., a recent or the latest version) of a software program for which a software publisher has not provided or publicized the identifier and/or the attributes that form a software model. Thus, traditional management systems may be unable to decipher the identifier into a software model to provide the requested management features, thereby generating errors that may contribute to client dissatisfaction. To resolve these issues, the management server may automatically generate placeholder data structures that facilitate asset management in response to determining that a received identifier of a software application is not linked to a software model in the one or more databases. For example, the management server of certain embodiments generates a placeholder map identifier that is associated with the identifier, as well as a new software model that is associated with the placeholder map identifier. The placeholder map identifier may be tracked or flagged within a placeholder identifier database, which operates similar to the identifier database, without associating verified or publisher-derived information with the placeholder map identifier. In other embodiments having the combined, identifier-software model database, the management system may omit the map identifiers and directly associate the new software model with the identifier in a placeholder identifier-software model database of the management system.

In either case, as recognized herein, corresponding new software models are generated, linked to identifiers, and utilized to facilitate software asset management features for software programs of the client instance. Moreover, as discussed below, the new software models may be leveraged during analysis of the software programs of an additional client instance, reducing data storage costs by avoiding generation of multiple software models for a single software program. Any client instance may submit attributes for inclusion within the new software models that are shared across the multiple client instances, in certain embodiments. That is, other client instances may benefit from new software models identified or for which attributes are provided by another client instance, and the other client instances may further contribute to the attributes of the new software models, thereby reducing duplication of data across the distributed computing architecture. Thus, in response to determining that the new software model is sufficiently complete or determining that the publisher has provided an official set of attributes for a particular software model, the management system may denote the new software model as complete, such as by moving the respective entry from the placeholder identifier database or the placeholder identifier-software model database to the full-fledged identifier database or identifier-software model database, respectively. Accordingly, provision and control of the new software model throughout synchronization processes of the management system enables the management server to effectively identify software programs of the client instance for delivering management features, such as software license management or cost analysis features associated with the software programs.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 is a screenshot of a user interface displaying entries of the identifier-software model database of the management system of FIG. 8, in accordance with aspects of the present disclosure.

DETAILED DESCRIPTION

Figure 1:
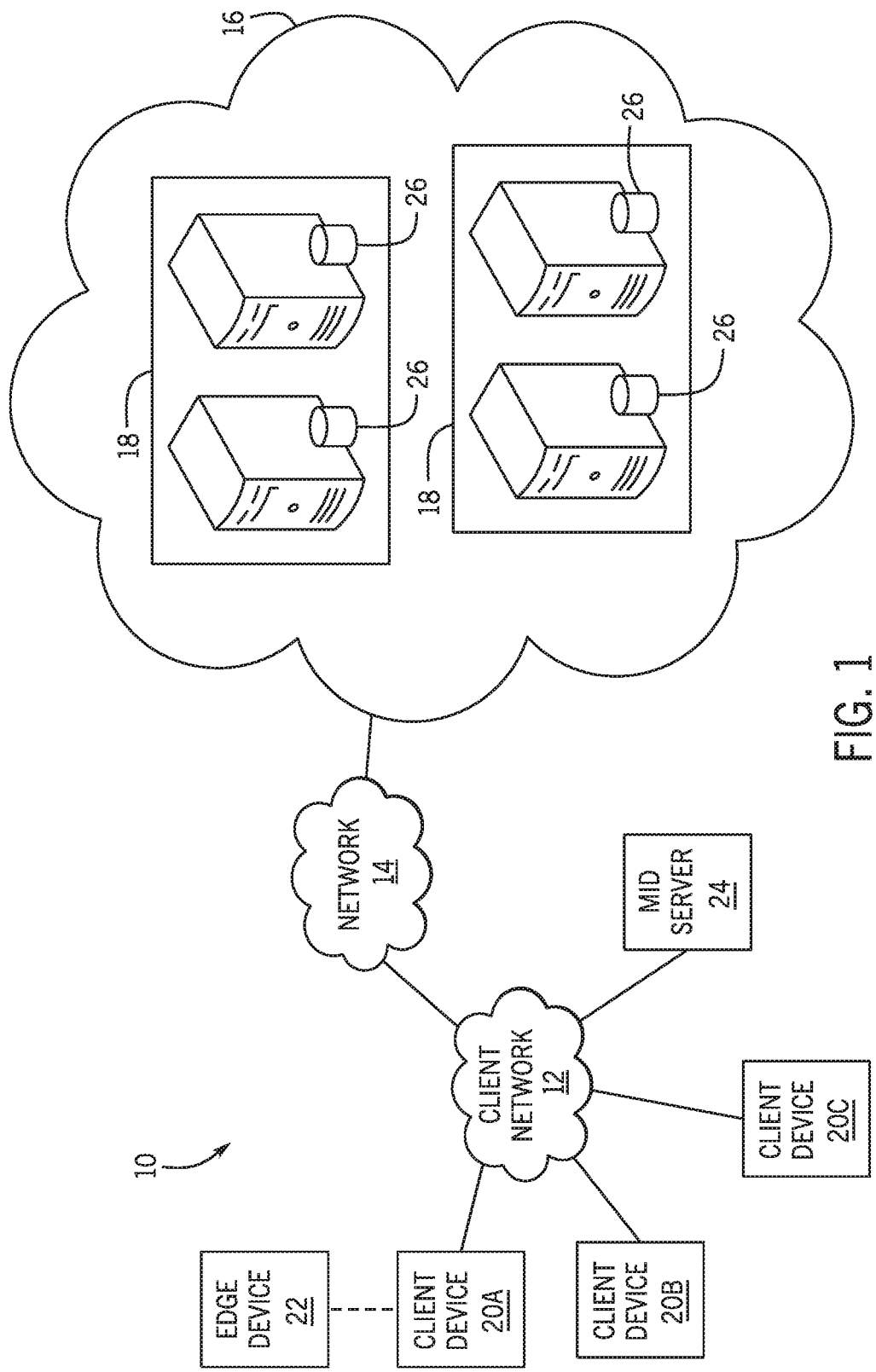
FIG. 1 is a block diagram of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "software model" refers to a data structure that defines or identifies a particular software program to enable software asset management for the particular software program. A software model may be individually configured for each respective variation of a software program. In particular, each software model may be defined by a set of attributes that distinguish the variation of the software program, including a software program name, a software program license type, a software program edition, a software program version, a software program release, a software program patch, a software publisher name, and so forth. Furthermore, as used herein, the term "version" refers to a respective build or build file associated with a given software program or software application installable on client devices of an enterprise network. The version of a software program may be denoted by a numeric representation that corresponds to changes or developments made to a software application, such as 1.0, 2.0, 2.05, 8.50.3, and so forth. As used herein, the term "edition" refers to the bundling, packaging, or selling of a respective software program within a software package for different experiences or degrees of completeness. As such, it is to be understood that a respective version of a software program may be available in multiple editions that each are targeted to a different segments of end-users, and that the version of a software program is distinct from or independent of an edition of the particular software program. Some examples of editions include standard, professional, home, education, enterprise, and so forth. Moreover, respective software licenses that accompany various software programs may differ in pricing for different editions, such that higher-end or more complete editions of a respective software program are more expensive than lower-end or less complete editions of the same software program. Thus, as used herein, the term "software asset management" refers to the analysis and/or monitoring of the software programs utilized by a client with respect to generating suitable recommendations regarding software license management, software cost analysis, software usage analysis, and so forth of the software programs of various editions and/or versions.

As mentioned, an enterprise or other client may use multiple software programs that are accessible through cloud-provided services, such as client instances. To enable users to perform desired work operations, a variety of software programs may be provided through the client instances. Additionally, each client instance may generally store an identifier for each software program that is derived from a software publisher, such as a stock keeping unit (SKU) or publisher part number (PPN). To enable asset management of the software programs used across multiple client instances, a management system disclosed herein includes a management server and certain databases, which collectively enable direct association (e.g., via one entry, step, or layer) or indirect association (e.g., via multiple entries, steps, or layers) of the identifiers with respective software models. Each software model generally defines a specific set of attributes, such as a name, publisher, edition, and/or version, of the underlying software program. Thus, by leveraging relationships stored in the certain databases, the management server of the management system converts the identifiers into software models that are suitable for providing software analysis, metering, and management. However, certain errors may be encountered when a received identifier is not associated with a respective software model (e.g., not recognized), such that traditional management systems are not able to identify the software programs on a client instance. Accordingly, desired improvements are provided by the presently disclosed management system, which resolves long-standing issues to deliver software asset management features by automatically generating new software models for previously unrecognized software programs and particularly linking the software models with their respective identifiers, as discussed herein.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
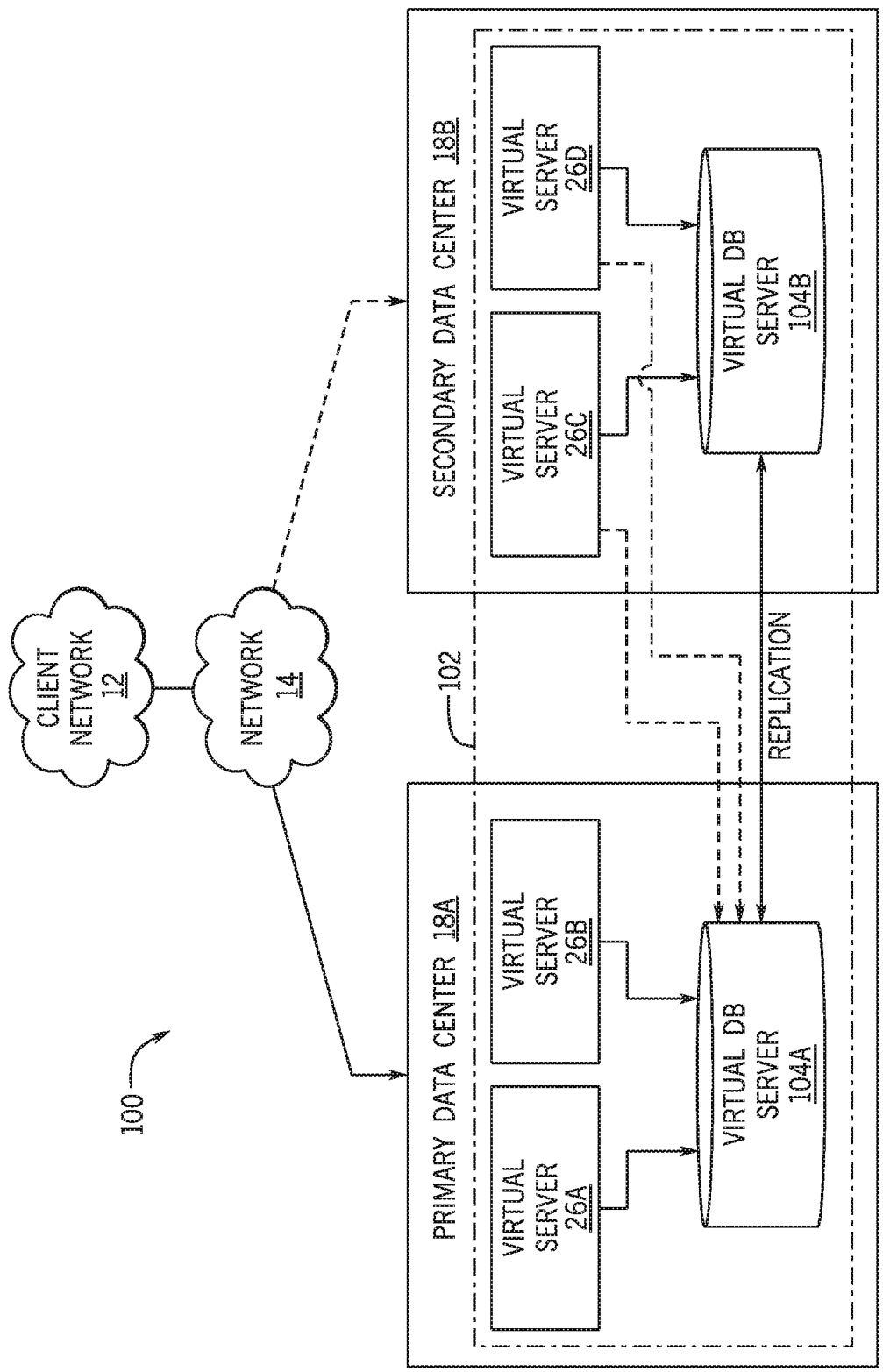
FIG. 2 is a schematic diagram of a multi-instance cloud architecture in which embodiments of the present disclosure may operate.

FIG. 2 is a schematic diagram of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
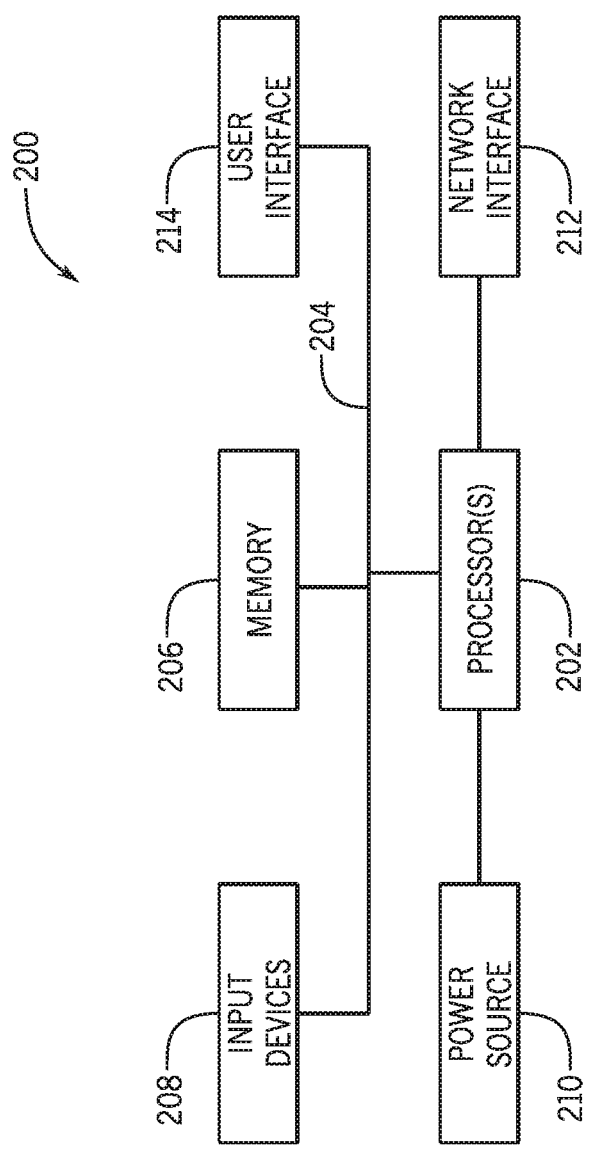
FIG. 3 is a block diagram of a computing system utilized in the architecture of FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

To enable end-users to perform certain enterprise tasks on their client devices 20, the cloud-based platform 16 may provide multiple software programs or applications to the client devices 20 via the client instance 102. The cloud-based platform 16 may also provide asset management features that verify licensing compliance, analyze cost expenditure and/or savings, as well as perform additional monitoring functions to improve the efficiency of how the software programs are used. To perform analysis on the software programs, the cloud-based platform 16 may identify at least some software programs accessed by users of the client instance 102 (e.g., stored or executed on the client devices 20). However, as mentioned above, certain identification processes may be interrupted or ineffective, such as in situations when the software programs are not described by reliable, publisher-based attributes (e.g., when the software programs are newly-released). To improve identification and discovery of software programs for improved asset management, the present techniques include a management system having a management server that generates and leverages placeholder identifying components or translation elements, as discussed herein.

Figure 4:
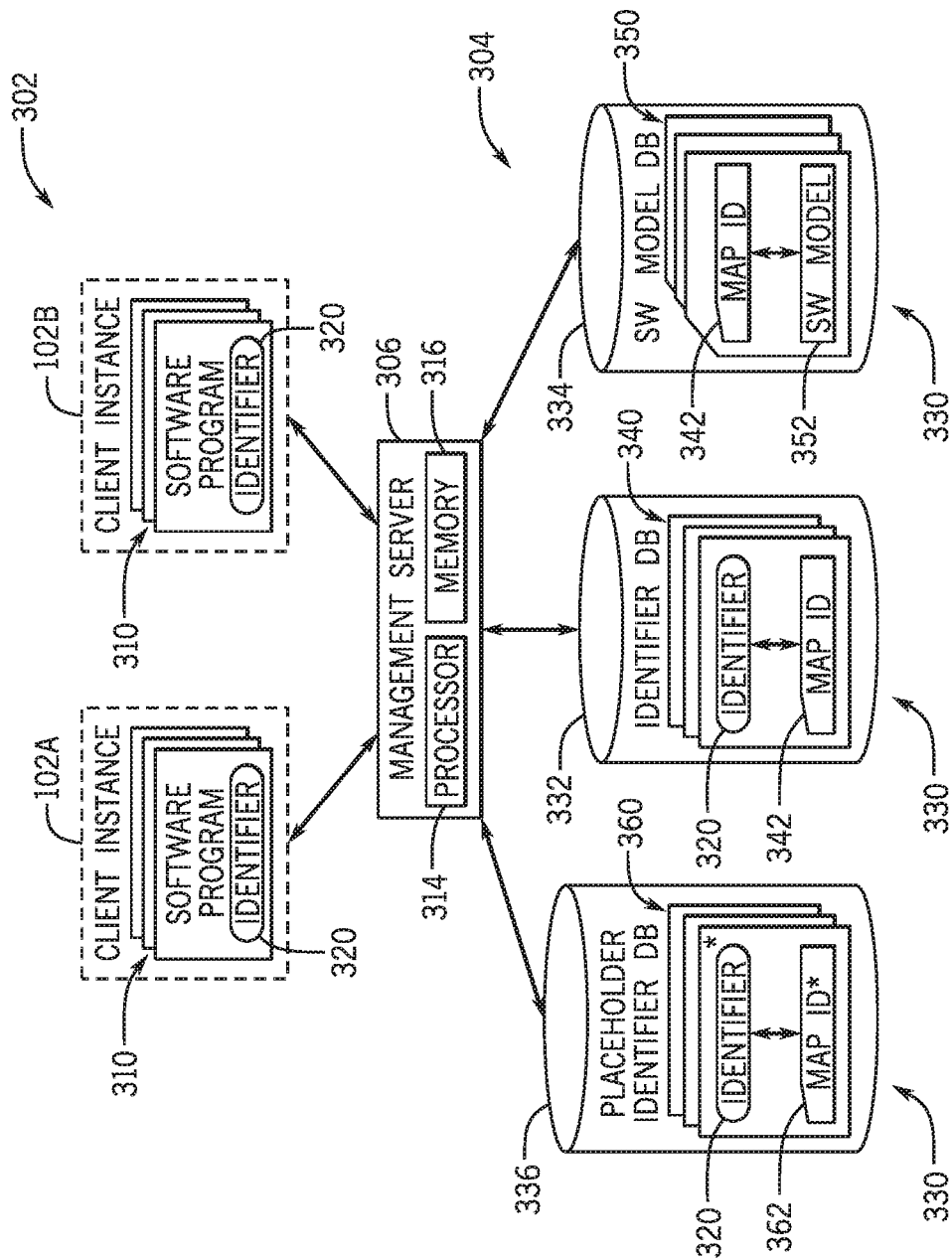
FIG. 4 is a block diagram of a management system operated by a management server to enable software asset management for software programs stored or executed on client instances of FIG. 2, in accordance with aspects of the present disclosure.

With the preceding in mind, FIG. 4 is a block diagram of a computing system 302 having a management system 304 operated by a management server 306, in accordance with aspects of the present disclosure. As noted above, the management server 306 analyzes software programs 310 that are accessible to one or multiple client instances 102, such as the illustrated first client instance 102A and second client instance 102B. The management server 306 may include one or more processors 314 and one or more memory devices 316 that facilitate performance of the steps disclosed herein. The one or more processors 314 may include one or more microprocessors capable of performing instructions stored in the memory 316. Additionally or alternatively, the one or more processors 314 may include ASICs, FPGAs, and/or other devices designed to perform some or all of the functions discussed herein without calling instructions from the memory 316. The memory 316 may include any suitable tangible, non-transitory, and computer-readable storage media having machine-readable instructions and/or data stored thereon. Moreover, it is to be understood that the management system 304 may additionally or alternatively include any other components suitable for communicating with the client instances 102 and other components discussed herein. For example, the management system 304 may include input devices, power sources, network interfaces, user interfaces, and/or other computer components useful in performing the functions described herein.

The management server 306 may be maintained by a service provider and facilitate operation of the client instances 102. In some embodiments, the management server 306 includes a content delivery service (CDS) server, a discovery server, a software asset management server, and/or any other suitable server supported by one or more databases of the above-discussed cloud-based platform 16. Additionally, the software programs 310 utilized on the client instances 102 may be provided through the management server 306 or another suitable component of the management system 304. Moreover, a portion or an entirety of the software programs 310 may be installed locally on the client devices 20 associated with the client instances 102. By way of non-limiting example, the software programs 310 may include word-processing software programs, report-generating software programs, modeling software programs, communication software programs, web-browsing software programs, and/or any other software programs (e.g., useful to an end-user of the client instances 102).

As previously noted, each software program 310 may be associated with or described by one or multiple identifiers 320 (e.g., identifier number, software program identifier). Each identifier 320 may include any suitable inventory management identifier, such as a stock keeping unit (SKU) or a publisher part number (PPN), which is unique to the particular embodiment of the associated software program 310. In certain embodiments, the identifier 320 is associated with a respective software program 310 by a publisher (e.g., software publisher, creator) of the software program 310. For example, the publisher may generate and/or use the identifier 320 to enable purchasing and/or installation of the software program 310 on various client devices 20 or client instances 102.

In certain cases, the publisher may provide, output, or broadcast information regarding the software program 310, such as the identifier 320, a program name, a program edition, a program version, and/or a publisher name, which may also be collectively referred to as attributes or fillable attributes of the software program 310. It should be understood that the publisher-derived information may include any suitable information that describes the respective software program 310 and facilitates software asset management. Notably, in certain situations, the client instances 102 may be equipped or provided with a particular software program 310 before a reliable source of the publisher-derived information is publically available or provided to the management system 304. In such cases, traditional management systems that lack the disclosed management server 306 may not be able to identify the software programs 310 on the client instances 102, creating gaps or errors in data that decrease the effectiveness of asset management provided by these traditional management systems.

To remedy these issues, the presently disclosed management system 304 leverages the management server 306 and certain databases 330 (e.g., management databases), which include an identifier database 332, a software model database 334, and a placeholder identifier database 336, in the present embodiment. The management server 306 controls, utilizes, and modifies the databases 330 in any suitable manner to provide identification of previously unrecognizable software programs 310, as discussed below with respect to FIG. 5. In some embodiments, the databases 330 are stored in any suitable storage or memory of the cloud-based platform 16 discussed above. It should be understood that the databases 330 may each include a respective suitable data structure to store the data described herein, such as relational database management system (RDBMS), an object database, an extensible markup language (XML) database, a configuration management database (CMDB), a management information base (MIB), one or more flat files (e.g., a table), and/or the like. Additionally, although indicated as separate entities, it should be understood that the databases 330 may be combined and/or demarcated in any suitable manner for performing the techniques described herein.

As illustrated, the identifier database 332 includes identifier entries 340 (e.g., product definitions) that link or associate the identifier 320 of a particular software program 310 with a respective map identifier, which is referred to hereinafter as a map ID 342. In certain embodiments, the identifier entry 340 and/or the map ID 342 corresponds to a discovery map (e.g., a DMAP), though any other suitable mapping element or translation module that enables the management system 304 to perform the described operations may be alternatively utilized. Moreover, the software model database 334 includes model entries 350 that each links a respective map ID 342 to a software model 352 of a particular software program 310. As used herein, the software model 352 for the particular software program 310 includes attributes that may be derived from the corresponding publisher of the particular software program 310, such as the program name, program edition, and publisher name. In certain embodiments, certain attributes of a software model 352 may be provided by a user of a client instance 102 or an information technology specialist associated with the management server 306, the client instance 102, the cloud computing system 10, the cloud-based platform 16, and/or one or more software programs 310. When the appropriate identifier entry 340 and appropriate model entry 350 are present in the databases 332, 334, the management server 306 may retrieve the software model 352 for a particular identifier 320, as discussed below.

Further, the illustrated placeholder identifier database 336 may include placeholder identifier entries 360 (e.g., missing product definitions) that each correlates a particular identifier 320 of a respective software program 310 to a placeholder map ID 362. In the illustrated embodiments, placeholder components are denoted by an asterisk (e.g., *) for clarity. As recognized herein and described in detail below, the management server 306 automatically generates the placeholder identifier entry 360 for the identifier 320 in response to the identifier 320 lacking an appropriate identifier entry 340 in the identifier database 332. The placeholder map ID 362 of the placeholder identifier entry 360 thereby provides a link or translation pathway for the identifier 320 to a new software model 352 that is blank, empty, null, or otherwise missing information, enabling conversion or association of the identifier 320 into a workable software model 352 suitable for storing attributes and enabling software asset management.

Figure 5:
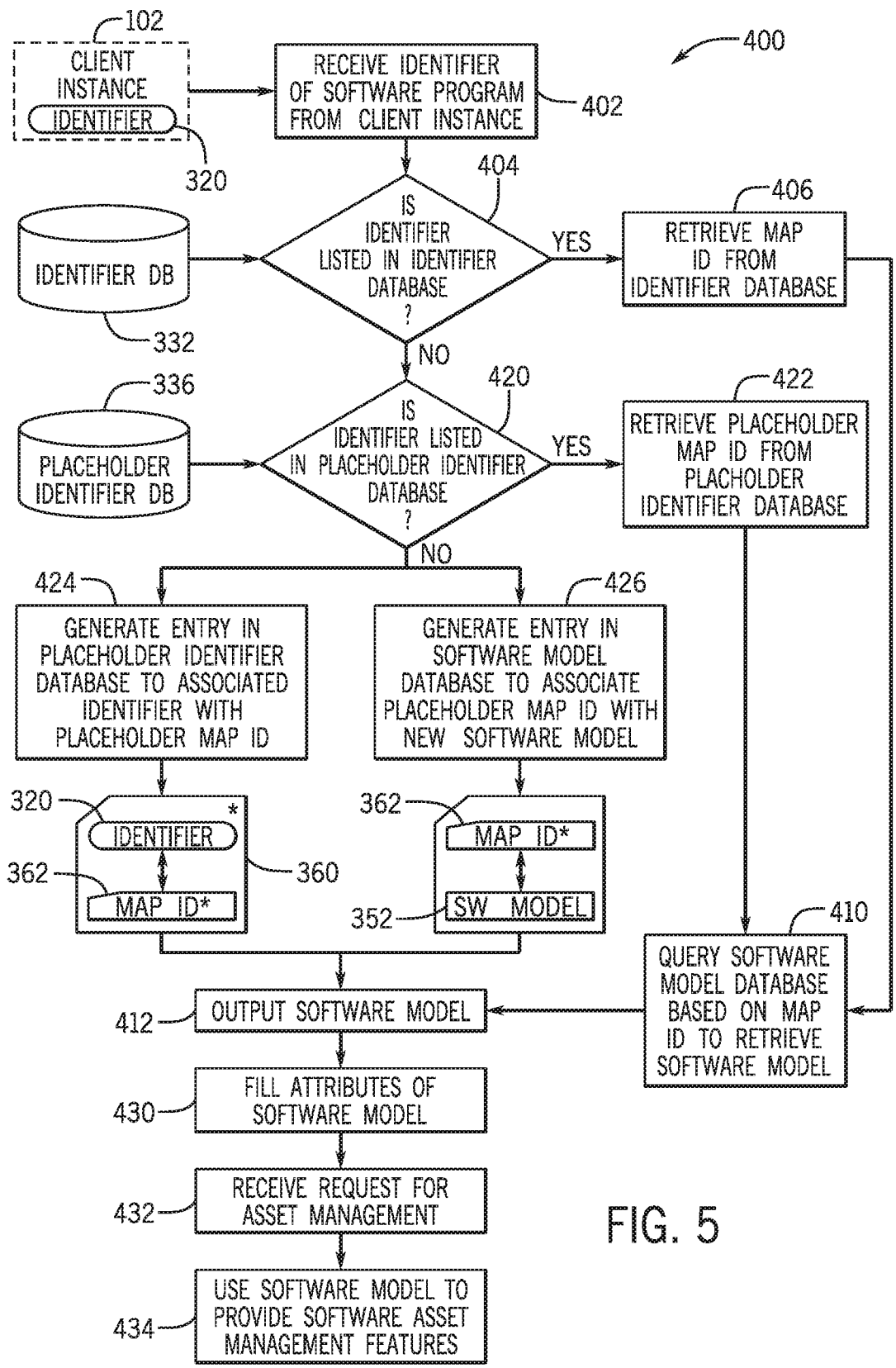
FIG. 5 is a flow diagram of a process depicting operation of the management server of FIG. 4 to identify software programs on client instances of FIG. 2, in accordance with aspects of the present disclosure.

FIG. 5 is a flow diagram of a process 400 depicting operation of the management server 306 of the management system 304 to identify and enable software asset management for software programs 310 without interpretable or recognized identifiers 320, in accordance with aspects of the present disclosure. The steps illustrated in the process 400 are meant to facilitate discussion and are not intended to limit the scope of this disclosure, because additional steps may be performed, certain steps may be omitted, and the illustrated steps may be performed in an alternative order or in parallel, where appropriate. The steps illustrated in the process 400 are performed by the management server 306, which, as discussed above, may be a CDS server coupled to the client instances 102 to enable identification and management of the software programs 310 for software asset management. Additionally, although generally discussed with reference to a single identifier 320 of a software program 310, it should be understood that the process 400 may be repeated or performed in parallel for multiple identifiers 320 of multiple software programs 310 of one or more client instances 102.

In the depicted example, the management server 306 receives (block 402) an identifier 320 of a software program 310 from a client instance 102. In some embodiments, the management server 306 retrieves the identifier 320 from a database or repository of the client instance 102, from the software program 310, or from any other suitable location within the client instance 102. In other embodiments, the client instance 102 pushes or sends the identifier 320 to the management server 306. Further, in certain embodiments, the client instance 102 may provide an alert to the management server 306 indicative of a new identifier 320 being available at the client instance 102, which enables the management server 306 to automatically receive or retrieve the identifier 320. In some embodiments, the identifier 320 is received during a periodic or regularly-scheduled process, such as a synchronization process. For example, the client instance 102 may provide the identifiers 320 of the software programs 310 on any suitable predetermined, scheduled basis, such as once a day, week, month, or the like.

After the identifier 320 is received, the management server 306 determines (block 404) whether the identifier 320 is listed in the identifier database 332. That is, the management server 306 may query the identifier database 332 to search for an identifier entry 340 therein that lists the identifier 320. In response to determining that the identifier 320 is listed in an existing identifier entry 340 (e.g., the identifier 320 is recognized), the management server 306 retrieves (block 406) the map ID 342 for the identifier 320 from the identifier entry 340 of the identifier database 332. Thus, the management server 306 may query (block 410) the software model database 334 based on the map ID 342 to identify a model entry 350 that associates the map ID 342 with a software model 352, thereby facilitating retrieval of the software model 352. The management server 306 may therefore output (block 412) the software model 352 associated with the previously recognized identifier 320.

Returning to block 404, in response to determining that the identifier 320 is not listed in the identifier database 332, the management server 306 determines (block 420) whether the identifier 320 is listed in a placeholder identifier entry 360 of the placeholder identifier database 336. As will be understood, the placeholder identifier entry 360 may be present during situations in which the management server 306 previously received an unrecognized identifier 320 (e.g., from the client instance 102 or other client instances 102), and subsequently, linked the identifier 320 with a new software model 352 (e.g., via creating a placeholder identifier entry 360 and a model entry 350). In response to determining that the identifier 320 is listed in the placeholder identifier database 336, the management server 306 retrieves (block 422) the placeholder map ID 362 from the placeholder identifier entry 360. The management server 306 may therefore perform blocks 410 and 412 to output the software model 352 corresponding to the identifier 320. Additionally, the management server 306 may add attributes to the software model 352. For example, the management server 306 may determine certain attributes (e.g., program name, publisher name, release, version, edition) and/or enable a user to submit certain attributes to further define the software model 352. In some embodiments, the management server 306 may verify whether a submitted or determined attribute is already included in the software model 352, and if not, include the attribute. Accordingly, by not creating additional placeholder-related entries and identifiers (e.g., placeholder identifier entry 360, placeholder map ID 362, new software model 352) when a placeholder has already been created, the management server 306 efficiency reduces duplication of data across multiple client instances 102 by building on or utilizing the previously generated placeholder identifier entry 360 that may be common to multiple client instances 102, instead of generating another placeholder identifier entry 360.

As presently recognized, in response to determining that the identifier 320 is not already listed in the placeholder identifier database 336 (e.g., is unrecognized), the management server 306 generates (block 424) a placeholder identifier entry 360 in the placeholder identifier database 336 to associate the identifier 320 with a new, placeholder map ID 362. Additionally, the management server 306 generates (block 426) an entry in the software model database 334 to associate the placeholder map ID 362 with a new software model 352. The new software model 352 may generally be a blank, empty, or incomplete data structure that enables software asset management features based at least on the recognition of the identifier 320 received from the client instance 102. It should be understood that blocks 424 and 426 may be performed in parallel or in any suitable order. As such, the management server 306 generates the components that facilitate efficient translation of the identifier 320 into the software model 352, which is output (block 412) by the management server 306.

Further, as another benefit of the present techniques, the management server 306 may fill (block 430) attributes of the software model 352 as the attributes are received at the management server 306. For example, based on the software model 352 provided to the client instance 102, a user associated with the client instance 102 may identify that the software model 352 relates to a particular software publisher and a particular program edition. In such a case, the user may provide the attributes to the client instance 102. Then, the client instance 102 and/or the management server 306 may update the software model 352 to include the attributes. Such a process desirably enables multiple client instances 102 to collaborate and complete a software model 352, even when publisher-derived information for the software program 310 is not available. In certain embodiments, the management server 306 may define or fill the attributes at block 430 in response to determining that publisher-derived information is now available. In response to determining that the software model 352 is completed (e.g., includes a threshold number of completed fields, includes at least a program name and a software publisher name), the management server 306 may update a status of the placeholder map ID 362 from a placeholder status to a completed status, such as by moving the corresponding placeholder identifier entry 360 from the placeholder identifier database 336 and into the identifier database 332. In other embodiments, the management server 306 may directly update a status parameter of the software model 352 to a completed or non-placeholder status.

The management server 306 may also receive (block 432) a request for software asset management from the client instance 102. The request may be received at the same time as the identifier 320 is received, may be inherent with the receipt of the identifier 320, or may be received on a predetermined, scheduled basis. Therefore, the management server 306 may leverage or use (block 434) the software model 352 to provide asset management features to the client instance 102. In some embodiments, the management server 306 queries the databases 330 to retrieve the attributes indicative of the software model 352 and present the software model 352 and any available management features to the client instance 102. That is, because the identifier 320 for the software program 310 is associated with the software model 352, the management server 306 may analyze usage of the software program 310 on the client instance 102 to provide license management recommendations, cost valuations, and so forth, based on any available attributes of the software model 352 (e.g., regardless of whether the publisher-derived information is available for the software program 310).

Figure 6:
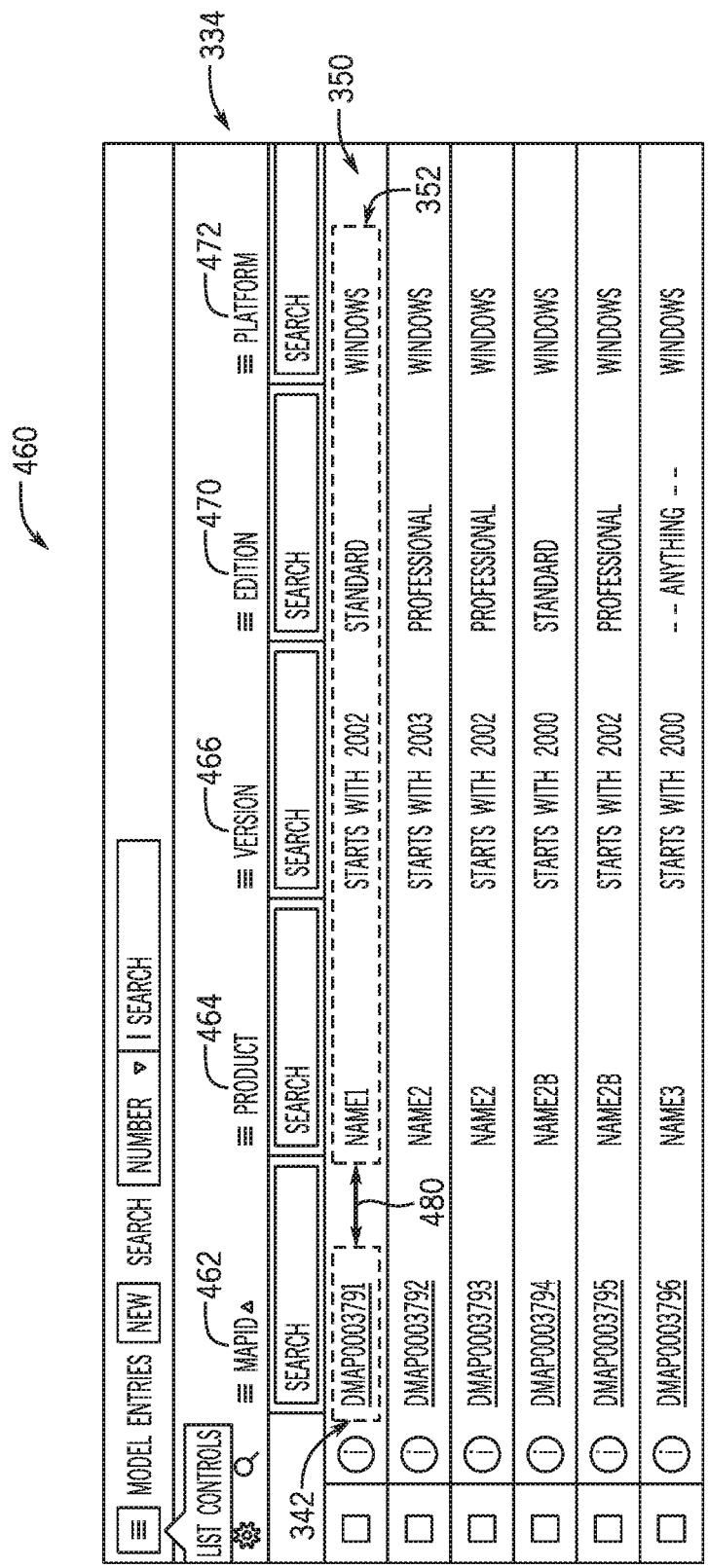
FIG. 6 is a screenshot of a user interface displaying entries of a software model database of the management system of FIG. 4, in accordance with aspects of the present disclosure.

To help illustrate steps and components of the process 400 and/or the management system 304, FIG. 6 is a screenshot of a user interface 460 displaying model entries 350 of the software model database 334, in accordance with aspects of the present disclosure. In some embodiments, the user interface 460 displays a screen on a suitable client device 20 or device coupled to the management server 306 to visually represent the associations between the map IDs 342 and the software models 352 stored in the respective model entries 350.

In the illustrated example, the user interface 460 includes a map ID column 462, a product column 464, a version column 466, an edition column 470, and a platform column 472. As used herein, the columns 464, 466, 470, 472 may each describe certain attributes of a software program 310 that collectively form a software model 352 for the software program 310. As such, each map ID 342 of the map ID column 462 is linked with a respective software model 352 of a software program 310, as indicated by arrow 480, to facilitate software asset management. With respect to a particular example, the map ID 342 of "DMAP0003791" is associated with the software model 352 for a software program having attributes that include "Name 1" as the product name, "Starts with 2002" as the version, "Standard" as the edition, and "Windows" as the platform.

Figure 7:
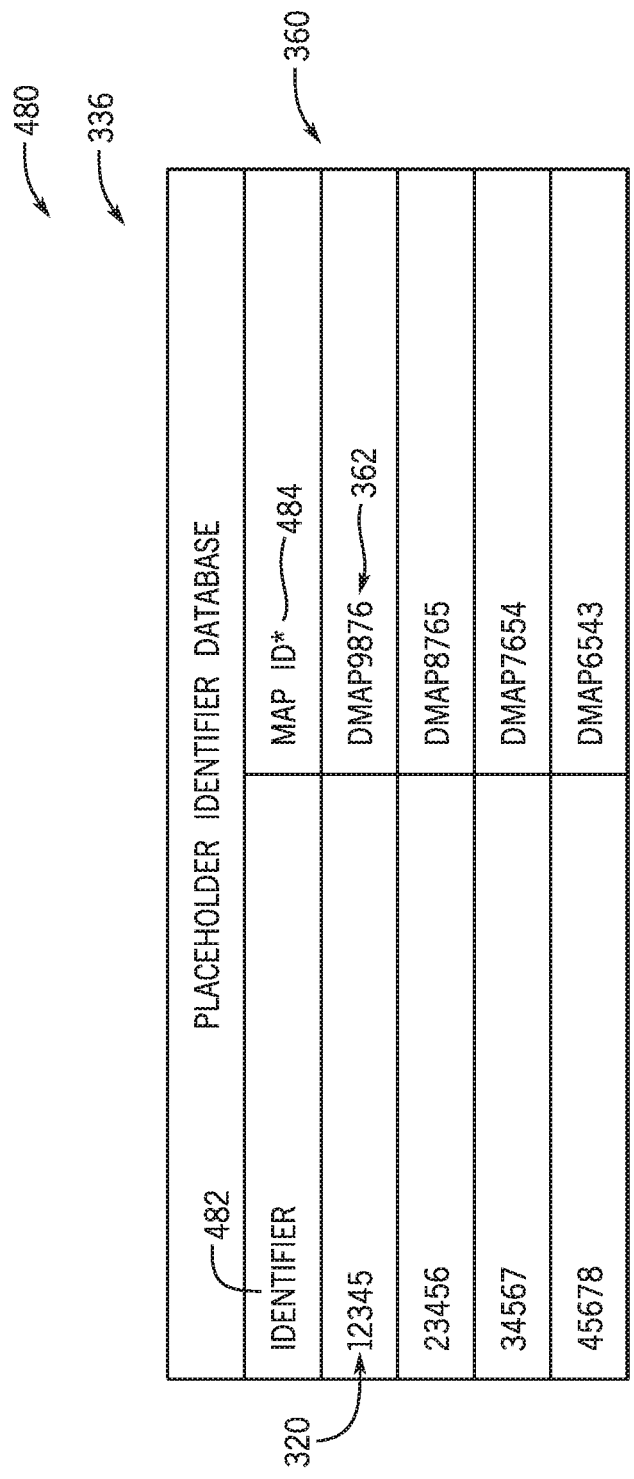
FIG. 7 is a table displaying entries of a placeholder identifier database of the management system of FIG. 4, in accordance with aspects of the present disclosure.

FIG. 7 is a table 480 displaying placeholder identifier entries 360 of the placeholder identifier database 336, in accordance with aspects of the present disclosure. The placeholder identifier database 336 includes an identifier column 482 and a placeholder map ID column 484, though it should be understood that the relationships stored in the placeholder identifier database 336 may be illustrated or stored in any other suitable data format. In the present example, each placeholder identifier entry 360 associates an identifier 320 with a corresponding placeholder map ID 362. Thus, during performance of the process 400 described above, the management server 306 may generate each new placeholder map IDs 362 as a translation element, relationship, or association between a respective identifier 320 and a software model 352. As mentioned, the placeholder identifier entries 360 may be relocated to the identifier database 332 in response to the associated software model 352 of the software program 310 being completed or otherwise accorded a non-placeholder status. As such, based on the listing of placeholder identifier entries 360, the placeholder identifier database 336 may enable efficient tracking of the software models 352 that are in progress or otherwise incomplete, while still enabling management features based on the respective identifiers 320.

Figure 8:
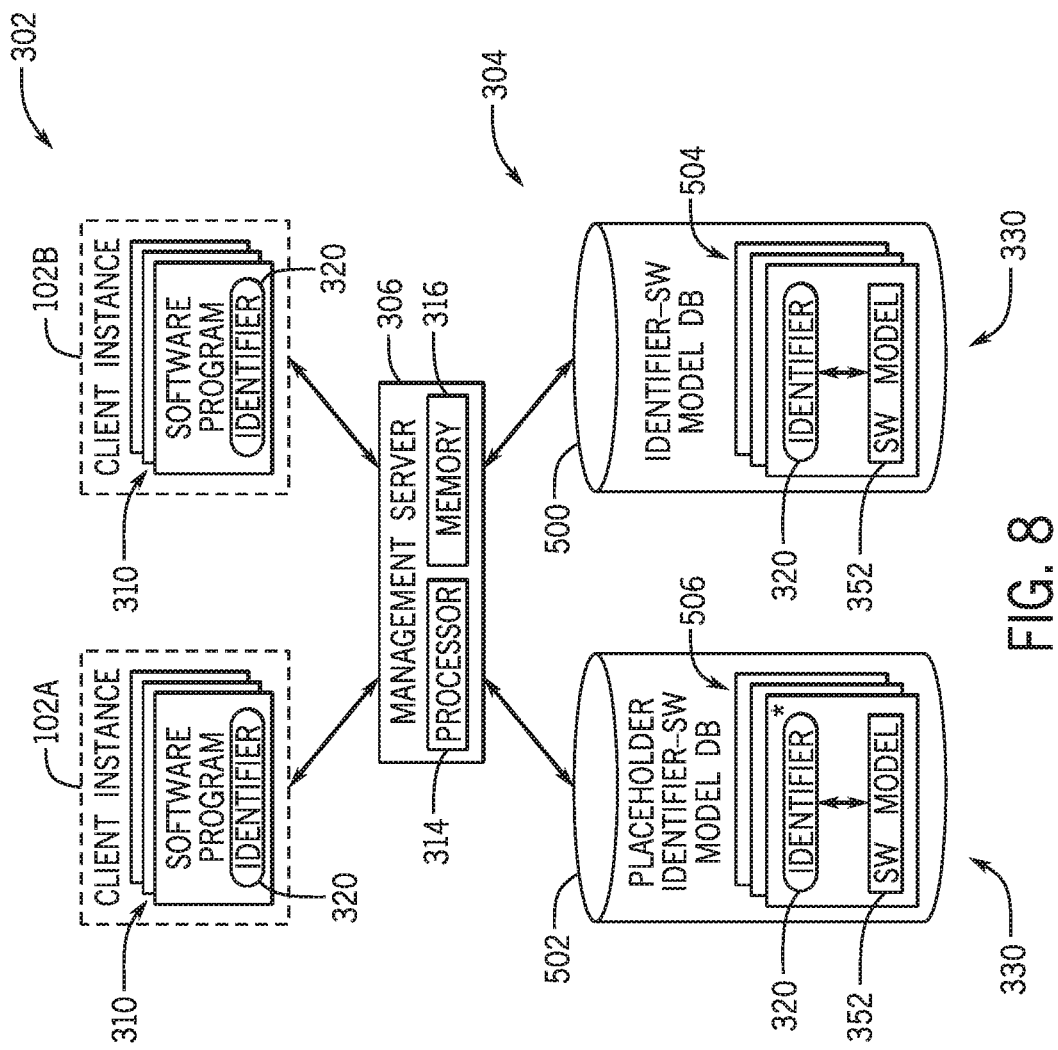
FIG. 8 is a block diagram of a management system having a management server and a composite, identifier-software model database for enabling software asset management, in accordance with aspects of the present disclosure.

FIG. 8 is a block diagram of the management system 304 of the computing system 302 that is controlled by the management server 306, in accordance with aspects of the present disclosure. The computing system 302 includes the management server 306 having the one or more processors 314 and the memory 316 described above, as well as the client instances 102A, 102B having the software programs 310 with respective identifiers 320. As mentioned, the databases 330 of the management system 304 may include in any suitable format that enables the identifier 320 of each software program 310 to be associated with a respective software model 352. Accordingly, the present example of the management system 304 omits the map IDs 342, and instead, directly links or associates each identifier 320 with its corresponding software model 352. As a result of the single-stage translation process, the databases 330 of the present embodiment include an identifier-software model database 500 and a placeholder identifier-software model database 502.

In particular, the identifier-software model database 500 may include identifier-software model entries 504 that each associates a respective identifier 320 of a software program 310 with the associated software model 352. Similarly, the placeholder identifier-software model database 502 includes placeholder identifier-software model entries 506 that each associate a respective identifier 320 of a software program 310 with a new (e.g., placeholder, incomplete) software model 352, the utilization of which is described below.

Figure 9:
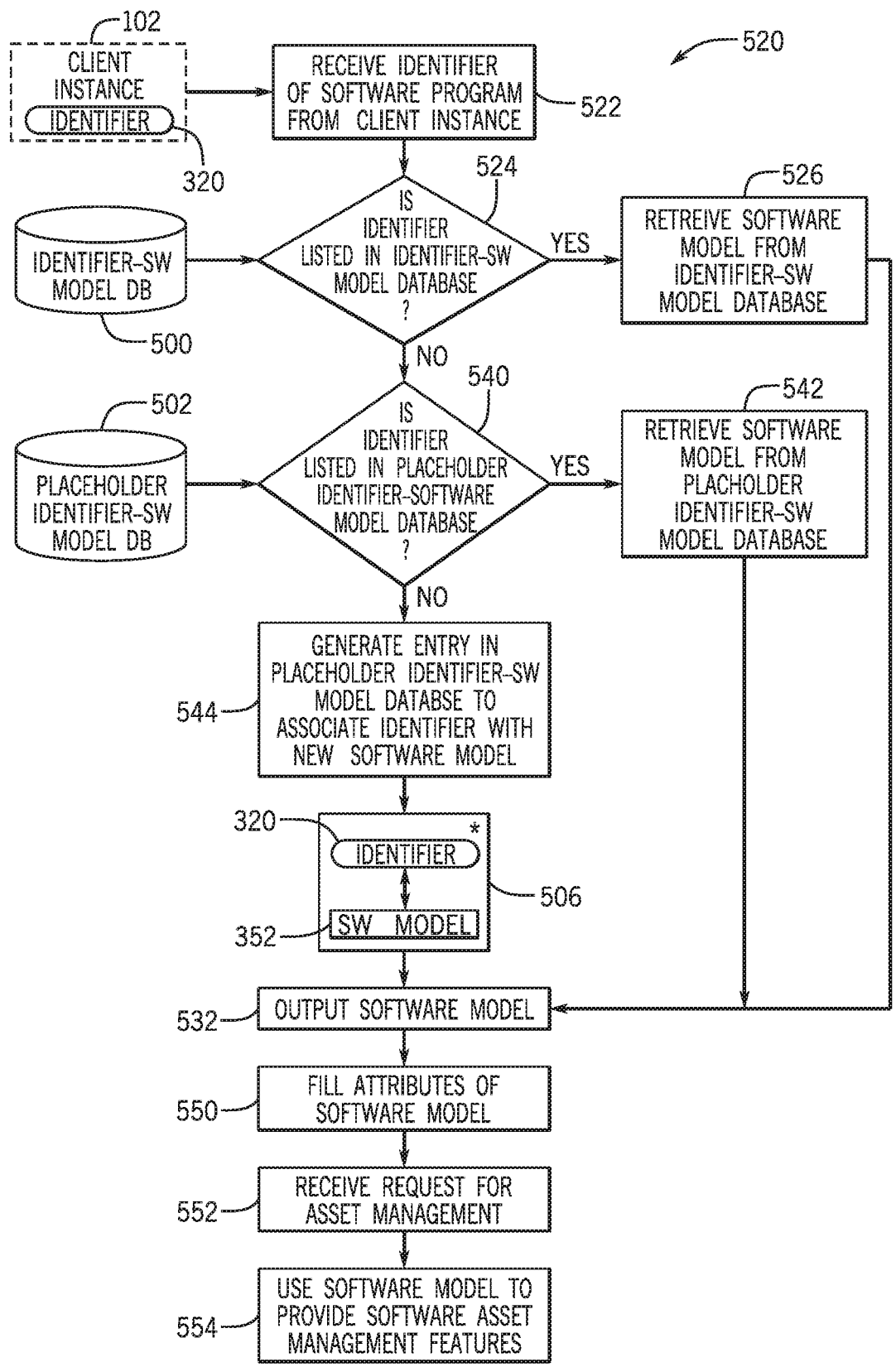
FIG. 9 is a flow diagram of a process depicting operation of the management server of FIG. 8 to identify software programs on client instances of FIG. 2, in accordance with aspects of the present disclosure.

FIG. 9 is a flow diagram of a process 520 depicting operation of the management server 306 of FIG. 8 to identify unrecognized software programs 310 via a one-stage identifier translation process and enable software asset management for software programs 310, in accordance with aspects of the present disclosure. As discussed above with respect to FIG. 5, the steps illustrated in the process 520 are performed by the management server 306 and are not intended to limit the scope of the present disclosure. Additionally, because certain steps of the process 520 are generally similar to certain steps of the process 400 of FIG. 5, these steps will not be discussed in detail. That is, the identifier-software model database 500 may generally replace or combine the features of the identifier database 332 and the software model database 334, such that one of ordinary skill in the art would readily understand the operation of the management server 306 having the identifier-software model database 500 based on the above description of the process 400 of FIG. 5.

In the illustrated embodiment, the management server 306 performing the process 520 receives (block 522) the identifier 320 of a software program 310 from a client instance 102. As discussed above with reference to block 402 of FIG. 5, the identifier 320 may be a SKU or a PPN associated with the software program 310 that may be received during on any suitable scheduled basis, in certain embodiments. Then, corresponding to the above discussion of the process 400 of FIG. 5, the management server 306 determines (block 524) whether the identifier 320 is listed in the identifier-software model database 500 (e.g., whether the identifier 320 is recognized). In response to determining that the identifier 320 is listed or recognized, the management server 306 retrieves (block 526) the software model 352 from the corresponding identifier-software model entry 504 and outputs (block 532) the software model 352. Alternatively, in response to determining at block 524 that the identifier 320 is not recognized or listed in the identifier-software model database 500, the management server 306 determines (block 540) whether the identifier 320 is listed in the placeholder identifier-software model database 502. If so, the management server may retrieve (block 542) the software model 352 from the placeholder identifier-software model database 502 and output (block 532) the software model 352.

Further, the management server 306 performing the illustrated process 520 may generate (block 544) a placeholder identifier-software model entry 506 in response to determining that the identifier 320 is not present in either of the databases 500, 502. The placeholder identifier-software model entry 506 directly associates the identifier 320 with a newly created software model 352, thereby efficiently enabling software asset management features for a previously unrecognized software program 310. The process 520 also includes blocks 550, 552, 554 that respectively correspond to blocks 430, 432, 434 of the process 400. It should be understood that the placeholder status of the placeholder identifier-software model entry 506 may be updated to a complete or non-placeholder status in response to determining that a threshold number of attributes of the corresponding software model 352 are updated, either based on client-provided and/or publisher-derived information.

To illustrate a particular example, FIG. 10 is a screenshot of a user interface 580 displaying entries the identifier-software model database 500, in accordance with aspects of the present disclosure. In the present embodiment, the identifier-software model database 500 includes an identifier column 582, which is illustrated as including PPNs. Each identifier 320 of the identifier column 582 is associated with a respective software model 352 that is defined by a particular set of attributes. For example, the attributes of the present embodiment are set forth by a publisher name column 590, a product name column 592, a license type column 594, a version column 596, an edition column 598, and a platform column 600, though it should be understood that any suitable set of attributes that enables a targeted set of management features to be determined and provided for the software programs 310 may be included in the software models 352.

As discussed herein, software asset management for an enterprise may be facilitated by multiple techniques and features. A management server of a management system may be in communication with multiple client instances to receive identifiers of software programs that are operating on the client instances. The management system also includes one or more databases that store relationships between the identifiers and software models of the software programs. The management server receives the identifiers from the client instances and determines, by querying the one or more databases, whether the identifiers are associated with software models of the software programs. In response to an identifier of a particular software program not being associated with a software model, the management server generates a new software model for the particular software program, and further, stores entries or relationships within the databases to link the new software model to the identifier. Thus, the management server may output the software model to the client instance to enable a client to provide attributes to be included in the software model, further improving a quality of the software asset management features accorded by the management system. Additionally, the software model may be utilized for additional client instances, thereby reducing or eliminating duplication of software models, while enabling multiple sources to contribute to the attributes that define each software model.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
one or more client instances hosted by one or more data centers, wherein one or more client devices access the one or more client instances, and wherein one or more software programs are installed or executable on the one or more client devices;
a management server of the one or more data centers that is communicatively coupled to the one or more client instances and one or more databases, wherein the one or more databases comprise a plurality of identifier entries, each associating a particular identifier of a respective software program of the one or more software programs with a particular software model of the respective software program, and wherein the management server is configured to perform actions comprising:
receiving a first identifier of a first software program from a first client instance of the one or more client instances;
querying the one or more databases to determine that the first identifier is not listed in a first existing identifier entry of the plurality of identifier entries;
in response to determining that the first identifier is not listed, generating a first software model associated with the first software program and generating a placeholder identifier entry in the one or more databases to associate the first identifier with the first software model; and
performing software asset management operations related to the first software program for the first client instance based on the first software model.

2. The system of claim 1, wherein the software asset management operations comprise software license management, software cost analysis, software usage analysis, or any combination thereof.

3. The system of claim 1, wherein the management server is configured to perform actions comprising:
receiving the first identifier of the first software program from a second client instance of the one or more client instances;
querying the one or more databases to determine that the first identifier is listed in the placeholder identifier entry of the plurality of identifier entries;
retrieving the first software model based on the placeholder identifier entry; and
performing additional software asset management operations related to the first software program for the second client instance based on the first software model.

4. The system of claim 1, wherein the management server is configured to perform actions comprising updating a set of attributes that define the first software model associated with the first software program based on information provided by the one or more client instances, a software publisher of the first software program, or both.

5. The system of claim 4, wherein the management server is configured to perform actions comprising updating a status of the placeholder identifier entry from a placeholder status to a complete status in response to determining that a threshold number of the set of attributes is filled.

6. The system of claim 4, wherein the set of attributes that define the first software model comprise a software program name, a software program license type, a software program edition, a software program version, a software publisher name, or a combination thereof related to the first software program.

7. The system of claim 1, wherein the management server is configured to perform actions comprising:
   receiving a second identifier of a second software program from the first client instance;
   querying the one or more databases to determine that the second identifier is listed in a second existing identifier entry of the plurality of identifier entries; and
   in response to determining that the second identifier is listed, retrieving a second software model associated with the second software program based on the second existing identifier entry to enable additional software asset management operations related to the second software program.

8. The system of claim 1, wherein the first identifier comprises a stock keeping unit or a publisher part number associated with the first software program.

9. The system of claim 1, wherein each identifier entry of the plurality of identifier entries associates the particular identifier of the respective software program with the particular software model of the respective software program indirectly via specifying a respective mapping identifier that is associated with the particular identifier, and wherein the one or more databases comprise:
   an identifier database comprising the plurality of identifiers entries that each associate the particular identifier with the respective mapping identifier;
   a placeholder identifier database comprising the plurality of identifier entries that each associate the particular identifier with the respective mapping identifier; and
   a software model database comprising a plurality of software model entries that each associate the respective mapping identifier with a particular software model of the respective software program.

10. The system of claim 1, wherein the one or more databases comprise an identifier-software model database comprising the plurality of identifier entries that enables a direct translation of each particular identifier into a respective software model.

11. A method of operating a management system having a management server coupled to one or more client instances, comprising:
   receiving, via the management server, a first identifier of a first software program operating on a first client instance of the one or more client instances;
   querying, via the management server, one or more databases of the management system to determine that the first identifier is not stored within the one or more databases, wherein the one or more databases comprise entries that associate a plurality of identifiers with a plurality of software models;
   in response to determining that the first identifier is not stored:
      generating, via the management server, a first software model of the first software program; and
      generating, via the management server, a placeholder entry in the one or more databases to associate the first identifier with the first software model; and
   performing software asset management operations related to the first software program for the first client instance based on the first software model.

12. The method of claim 11, comprising filling, via the management server, at least one attribute of a set of attributes that defines the first software model based on user input provided from the first client instance.

13. The method of claim 12, comprising performing, via the management server, analysis of the first software program for each client instance of the one or more client instances that utilizes the first software program based on the set of attributes that defines the first software model.

14. The method of claim 11, comprising:
   receiving, via the management server, the first identifier from a second client instance of the one or more client instances;
   determining, via the management server, that the first identifier is present in the one or more databases and associated with the first software model; and
   outputting, via the management server, the first software model to the second client instance.

15. The method of claim 11, wherein the entries of the one or more databases directly associate each respective identifier of the plurality of identifiers with a respective software model of the plurality of software models.

16. The method of claim 11, wherein the entries of the one or more databases comprise:
   first entries that each associate the respective identifier of the plurality of identifiers with a respective map identifier; and
   second entries that each associate the respective map identifier with a respective software model of the plurality of software models.

17. A tangible, non-transitory, machine-readable medium comprising machine-readable instructions, wherein the machine-readable instructions, when executed by one or more processors, cause the one or more processors to perform operations comprising:
   receiving a plurality of identifiers from a client instance coupled to the one or more processors, wherein each identifier of the plurality of identifiers is associated with a respective software program accessible on the client instance;
   determining whether each identifier of the plurality of identifiers is listed in one or more management databases;
   for each identifier that is listed in the one or more management databases, outputting a respective software model for the respective software program, wherein the respective software model enables the one or more processors to analyze usage of the respective software program on the client instance; and
   for each unrecognized identifier of at least one identifier that is not listed in the one or more management databases:
      generating a new software model for the respective software program; and
      generating at least one new entry in the one or more management databases that stores an association between the new software model and the respective unrecognized identifier.

18. The tangible, non-transitory, machine-readable medium of claim 17, wherein the machine-readable instructions, when executed by the one or more processors, cause the one or more processors to receive the plurality of identifiers from the client instance during a scheduled, periodic synchronization process.

19. The tangible, non-transitory, machine-readable medium of claim 17, wherein the machine-readable instructions, when executed by the one or more processors, cause the one or more processors to generate the at least one new entry by:
   storing a first entry in an identifier database of the one or more management databases that associates the respective unrecognized identifier with a mapping identifier; and
   storing a second entry in a model database of the one or more management databases that associates the mapping identifier with the new software model.

20. The tangible, non-transitory, machine-readable medium of claim 17, wherein the machine-readable instructions, when executed by the one or more processors, cause the one or more processors to generate the at least one new entry by storing an entry in an identifier-software model database of the one or more management databases that directly associates the respective unrecognized identifier with the new software model, wherein the new software model comprises a set of fillable attributes that enable the one or more processors to perform asset management for the respective software program.

* * * * *